J. J. GRANT.
MACHINE FOR MANUFACTURING CASTLE NUTS.
APPLICATION FILED DEC. 10, 1919.

1,404,022.

Patented Jan. 17, 1922.
4 SHEETS—SHEET 1.

Inventor:
John J. Grant,
by
Pease, Merkel & Saywell,
Attorneys.

J. J. GRANT.
MACHINE FOR MANUFACTURING CASTLE NUTS.
APPLICATION FILED DEC. 10, 1919.

1,404,022.

Patented Jan. 17, 1922.
4 SHEETS—SHEET 3.

Inventor:
John J. Grant,
by Freas, Merkel-Sayville,
Attorneys.

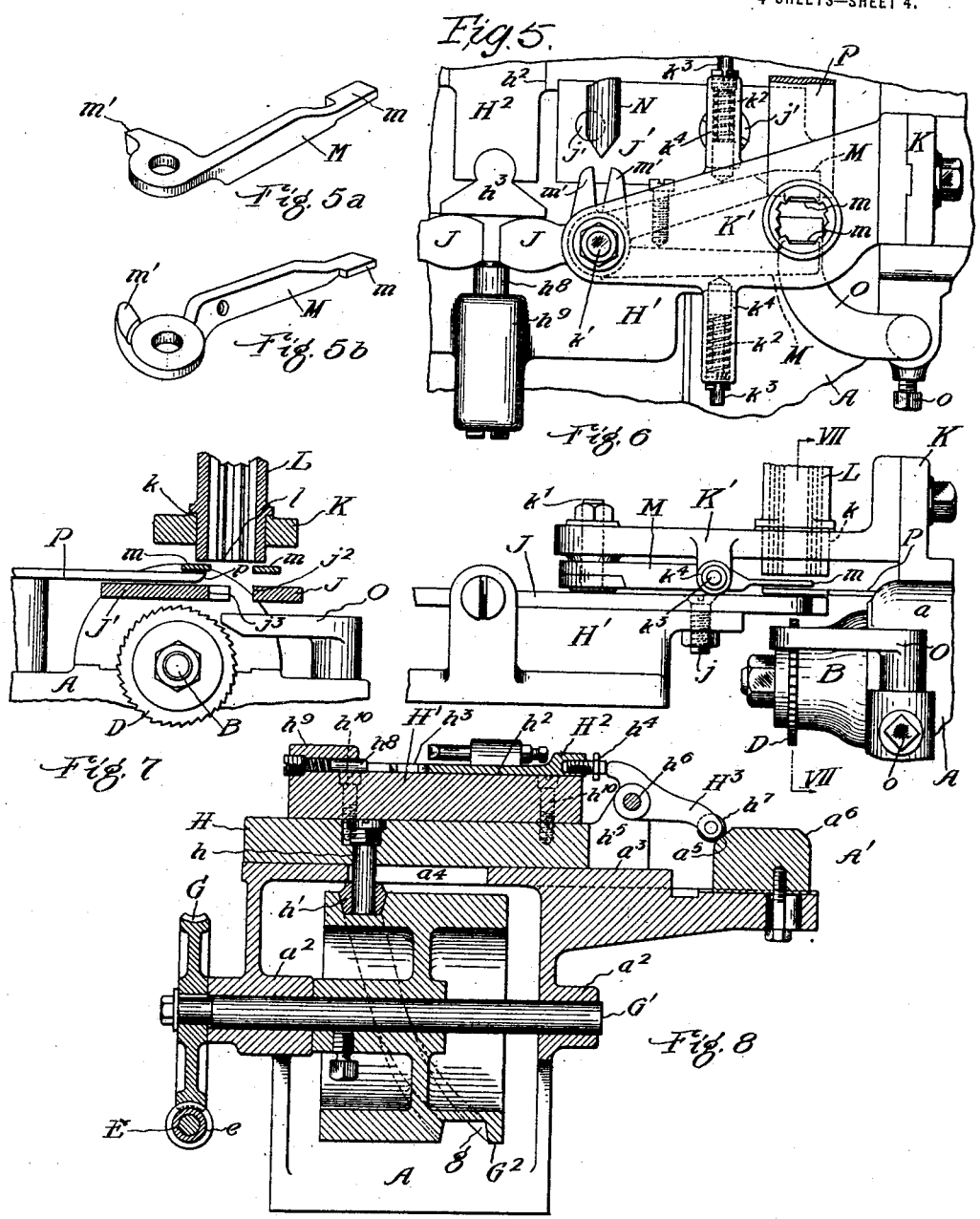

UNITED STATES PATENT OFFICE.

JOHN J. GRANT, OF NEW YORK, N. Y.

MACHINE FOR MANUFACTURING CASTLE NUTS.

1,404,022.   Specification of Letters Patent.   Patented Jan. 17, 1922.

Application filed December 10, 1919. Serial No. 343,911.

*To all whom it may concern:*

Be it known that I, JOHN J. GRANT, a citizen of the United States, resident of New York, county of New York, and State of New York, have invented new and useful Improvements in Machines for Manufacturing Castle Nuts, of which the following is a specification, the principle of the invention being herein explained and the best mode in which I have contemplated applying that principle, so as to distinguish it from other inventions.

My invention relates to machines especially designed for manufacturing what are ordinarily known in the art as castle nuts, that is, nuts whose upper surface is intersected by diametrically placed grooves varying in number, which are provided for the reception of a cotter-pin passing through the bolt to which the nut is applied, for the purpose of locking the latter in place thereon.

The object of the invention is to provide a machine which will be simple and effective in its operation, of simple construction, which will be partially automatic in its character, and which will impart to the upper surface of nuts previously prepared, the diametrical grooves above referred to and which convert ordinary nuts into castellated nuts.

The said invention consists of means hereinafter fully described, and particularly set forth in the claims.

The annexed drawings and the following description set forth in detail certain mechanism embodying my invention, the disclosed means, however, constituting but one of various mechanical forms in which the principle of the invention may be applied.

In said annexed drawings:

Figure 1 is a front elevation of a nut-castellating machine embodying my invention.

Figure 2 is a plan of such machine, certain parts, however, being omitted to disclose portions of the mechanism located beneath same. Figure 2ᵃ is a horizontal section of the magazine on an enlarged scale. Figures 2ᵇ and 2ᶜ are plans of two nuts illustrating the form of same after the first two operations. Figure 2ᵈ is a side elevation of a nut upon which one operation has been performed.

Figure 5 is a fragmentary plan of a portion of the mechanism on an enlarged scale, showing the parts in a position varying slightly from that shown in Figure 2. Figures 5ᵃ and 5ᵇ are detail perspective views of the holding levers which form the means for holding the blanks in the magazine.

Figure 6 is a detail fragmentary front elevation on an enlarged scale, of the machine.

Figure 7 is a cross-section taken upon the plane indicated by line VII—VII in Figure 6.

Figure 8 is a section similar to that shown in Figure 4, showing the parts in a different position.

The machine illustrated as embodying my invention comprises a main frame A, upon which all the moving parts are mounted. A portion of the moving elements is duplicated and placed symmetrically upon opposite sides of a perpendicular median transverse plane, so as to provide mechanism for operating simultaneously upon two different sets of nuts, part of the driving mechanism, however, being common to both sets of parts. Two complete machines are therefore illustrated, which are, however, as before noted, mounted upon a single frame, and driven partially by common driving mechanism. It will, therefore, be only necessary to describe those elements constituting all of the parts comprising one complete machine in order to clearly understand the construction and operation of the device illustrated, and the following description will therefore be confined to the construction and operation of such one machine.

Figure 1:
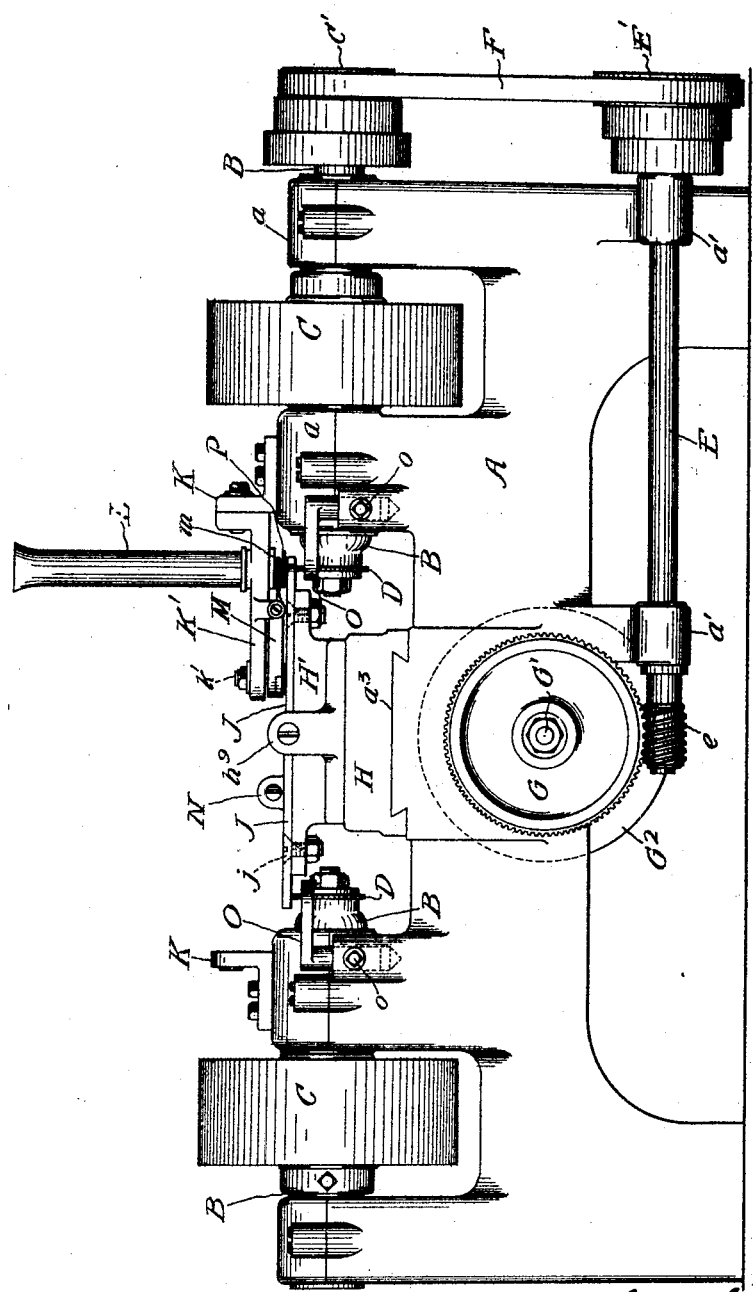
Figure 3:
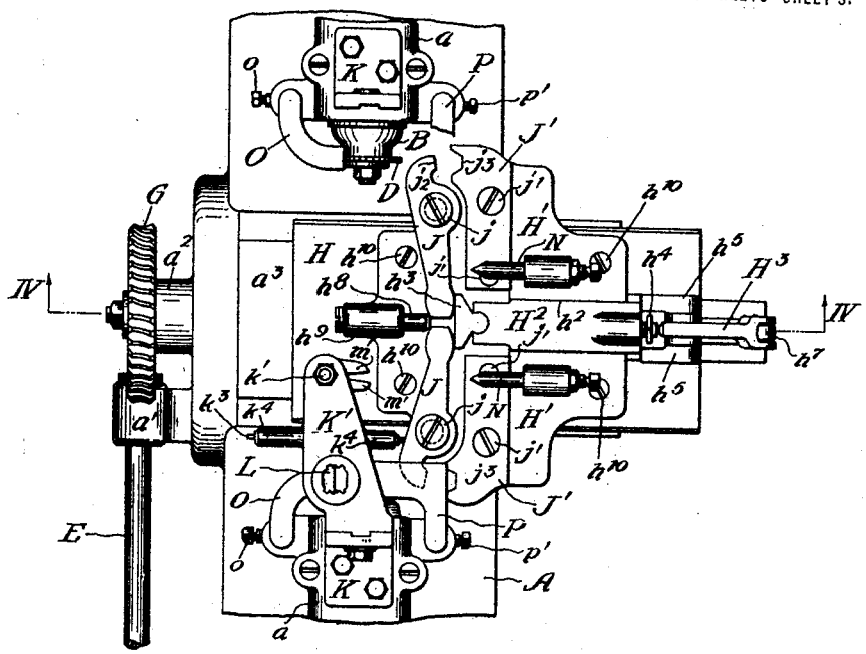
Figure 3 is a plan similar to that shown in Figure 2, but illustrating the parts of the mechanism in a different position.

Figures 1, 3 and 5 in so far as they illustrate the various parts of the device, show all of the elements on the right-hand side of the machine, but omit the frame extension carrying the magazine and nut holding device of the left hand side, and hereinafter described.

Figure 2:
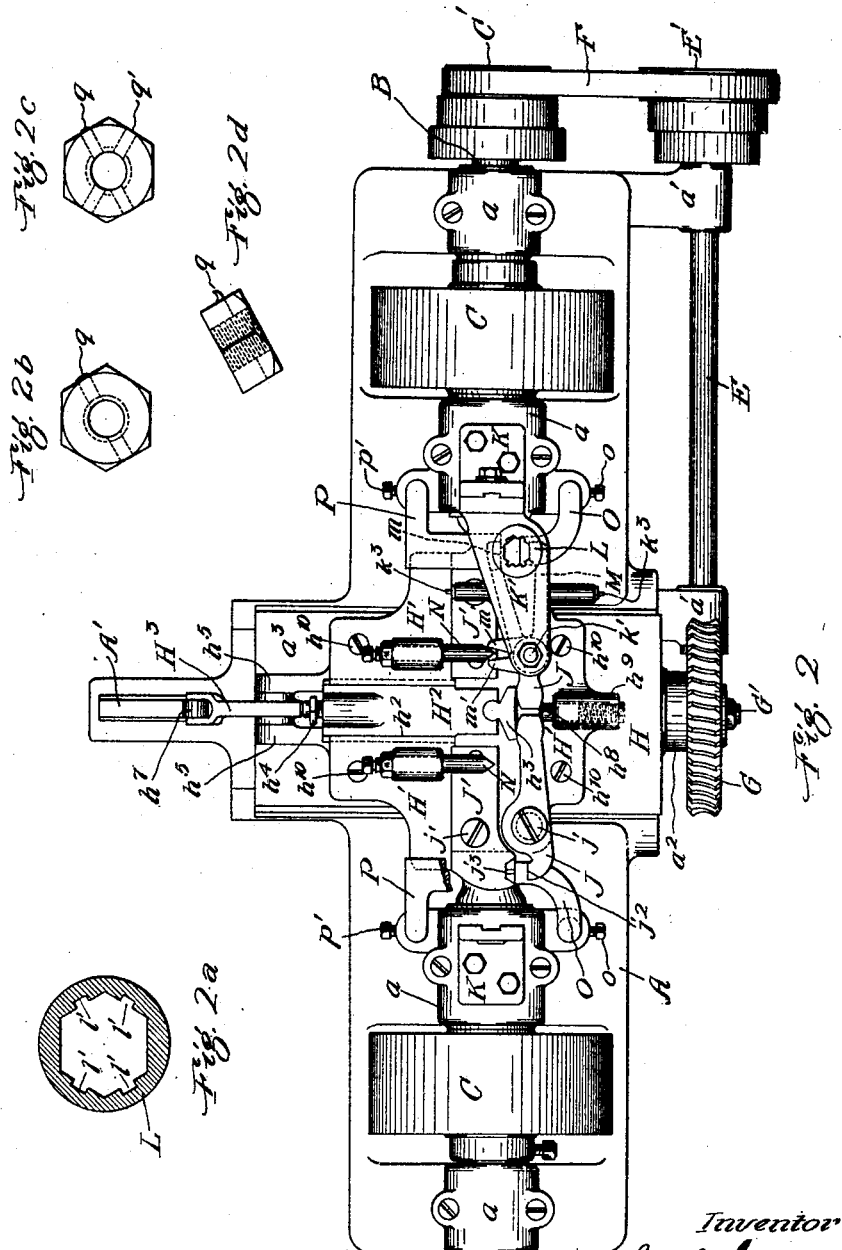

Mounted in suitable bearings *a a* on the frame A is a spindle B, Figures 1 and 2. Upon that portion of the spindle intermediate of said bearings is fixedly secured a driving pulley C, by means of which and a suitable belt, (not shown) the spindle may be rotated. Fixed upon the inner end of the latter is a rotary saw D, Figures 1, 3, 6 and 7, adapted to form the diametrical grooves which form the distinguishing characteristic of castle nuts.

Upon the outer end of the spindle B is fixedly secured a cone pulley C', and mounted in bearings $a'$ $a'$, Figures 1 and 2, is a driving shaft E, upon whose outer end is secured a cone-pulley E'. A belt F connects the two pulleys, and it will be seen that the shaft E may therefore be driven by the driving pulley C.

Figure 4:
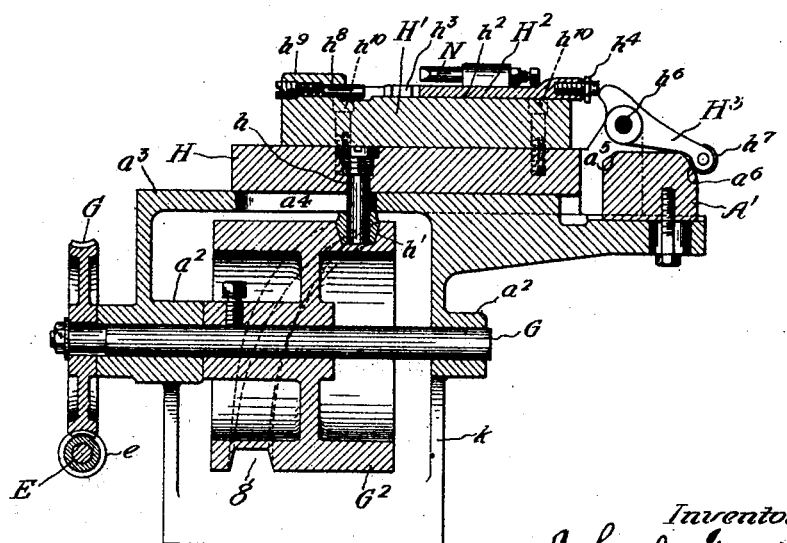
Figure 4 is a transverse section of the machine taken upon the plane indicated by line IV—IV in Figure 3.

Upon the inner end of the shaft E is fixed a worm $e$, which engages a worm wheel G fixed to the front end of a shaft G' which is placed transversely of the frame, and whose axis lies in the afore-mentioned median plane, as shown in Figures 2 and 4. This shaft is mounted in bearings $a^2$ $a^2$ at the front and back respectively of the frame A, as shown in Figures 4 and 8. Upon the intermediate portion of the shaft G' is fixed a cam drum $G^2$, provided with a cam groove $g$, as shown in Figures 4 and 8.

Upon the frame A immediately above the cam drum $G^2$ is formed a transverse slideway $a^3$, on which is reciprocatingly mounted a slide H. This slide-way is provided with a slot $a^4$, Figures 4 and 8, through which projects a stud $h$ which is fixedly secured to the slide H and carries upon its lower end an antifriction roller $h'$ which engages the cam groove $g$ of the cam drum $G^2$. The length of the slot $a^4$ is made such that the stud may travel therein unobstructedly throughout the rotation of the cam drum, as will be understood. The rotation of the latter will therefore, as is readily seen, effect the reciprocation of the slide H.

The upper portion of the slide H comprises a separate block H' which is fixedly secured to the main portion of the slide by means of suitable screws $h^{10}$ $h^{10}$, as shown in Figures 4 and 8. Formed on the upper side of the block H' is a slide-way $h^2$, Figures 2 and 3, which is parallel with the slide-way $a^3$, and in which is mounted a reciprocatory slide $H^2$, Figures 2, 3, 4 and 8. The forward end of this latter slide is provided with a fixedly secured abutment member $h^3$. The rear end of the slide $H^2$ has projecting horizontally therefrom an abutment screw $h^4$, which may be turned to project various distances from the slide, and which is therefore adjustable in its nature.

At the rear end of the main or lower portion of the slide H are formed two standards $h^5$ $h^5$, Figures 2, 3, 4 and 8, carrying a horizontal pivot pin $h^6$. This pin has mounted thereon a lever $H^3$, whose rear arm carries on anti-friction roller $h^7$, Figures 4 and 8. This arm, and hence the roller, being mounted upon the slide H, has, therefore, a path of reciprocatory movement, and this path is intersected by a cam block A', which has a forwardly and downwardly curved portion $a^5$, and a rearwardly and downwardly curved portion $a^6$, shown in Figures 4 and 8. The forward arm of the lever $H^3$ lies in the reciprocatory path of movement of the abutment screw $h^4$. When the slide H is in its rearmost position, the roller $h^7$ will be in engagement with the rearmost portion $a^6$ of the cam block A', as shown in Figure 4.

Mounted upon the forward portion of the slide H is an oscillatory gripping lever J, Figure 3, pivoted upon a screw $j$ fixed to the slide H. This lever extends transversely of the slide, as shown, and the front face of its inner end is engaged by a spring-actuated bolt $h^8$ mounted in a bore formed in a lug $h^9$ forming an integral part of said slide, as shown in Figures 2 and 5. This bolt holds the said inner end of the lever J in engagement with the abutment member $h^3$ on the slide $H^2$, and the length of the latter is such as to cause this bolt to furthermore hold the abutment screw $h^4$ in engagement with the forward end of the lever $H^3$, while the roller of the latter is in engagement with cam-block A', as shown in Figure 4. An auxiliary and complementary gripping member J' is provided, and fixed to the upper surface of the slide H by means of suitable screws $j'$ $j'$, Figures 2 and 3. The outer end of the lever J is provided with a gripping jaw $j^2$, which co-operates with the gripping jaw $j^3$ formed on the fixed gripping member J' to hold a nut while being slotted, as will hereinafter be fully explained.

When the slide H is in its forward position, and the roller $h^7$ engages the portion $a^5$ of the cam block A', it will be noted that the forward end of the lever $H^3$ is tilted upwardly and occupies its rearmost position, as shown in Figure 8. This permits the spring-actuated bolt $h^8$ to push the slide $H^2$ rearwardly on slide H, and therefore permits the inner end of the gripping lever J to move backwardly and cause the jaw $j^2$ to assume an open position when the slide occupies such forward position. On the slide $H^2$ being moved rearwardly by cam drum $G^2$, the roller $h^7$ is raised, and the lever $H^3$ tilted so as to cause its forward end to move forwardly with reference to slide H, bear against the abutment screw $h^4$ and push the slide $H^2$ forwardly with reference to slide H while the latter is being moved rearwardly. The slide $H^2$ therefore moves the inner end of the gripping lever J forwardly against the action of the spring-actuated bolt $h^8$, and causes the jaw $j^2$ to assume its closing position with reference to jaw $j^3$. The main portion of the upper surface of the cam block A' is substantially flat, as is shown in Figures 4 and 8, and the roller $a^7$ therefore, throughout the greater portion of its travel, moves over this flat portion. The closed position of the gripping jaw $j^2$ will hence be maintained throughout the major portion of the just-described reciprocatory stroke of the slide H, which is, as will hereinafter appear, the operative stroke of such slide. Near the rear end of such stroke, the roller engages the portion $a^6$ of the cam block, thereby permitting the forward end of lever $H^3$ to again recede, and the jaw $j^2$ to re-assume its open position, the position of the parts at this time being shown in Figure 8.

It will, therefore, be apparent that when a nut of proper dimensions is dropped between the jaws while the slide H occupies its forward position, it will be received therebetween. The nut being so received, shortly after the inception of the rearward or operative stroke of the slide, the jaw $j^2$ assumes its closing position and securely grips the nut between it and jaw $j^3$, and while so held the slotting operation, as will hereinafter appear, takes place. At the end of the rearward stroke of the slide the jaws again assume their open position, and the nut is discharged by gravity therefrom.

Secured to the top of the bearing $a$ is a bracket K, to which is bolted an extension K′, which projects transversely of the direction of reciprocation of the slide H. This extension is provided with an opening $k$ through which projects, and in which is secured, a vertical tubular magazine L, as shown in detail in Figure 7, located forwardly of the saw D. The outer end of the extension K′ has secured thereto a vertical pin $k'$, and pivotally mounted upon this pin and below the extension are two oscillatory holding levers M M. The outer ends of these levers are formed with holding jaws $m$ $m$, which are located immediately below the discharge end or mouth $l$ of the magazine, as shown in Figure 7. These levers are engaged from opposite directions by two bolts $k^3$ $k^3$ mounted in barrels $k^4$ $k^4$ respectively and actuated by springs $k^2$ $k^2$ to cause said jaws $m$ $m$ to assume or tend to assume their closed position.

The bore of the magazine L is of a cross-section corresponding with the cross-section of the nuts to be operated upon, in this instance hexagonal, and is of an area such as to permit the nuts to slide unobstructedly and downwardly therethrough by gravity. The holding jaws $m$ $m$, when occupying their closed positions such as shown in Figure 7, present a contracted opening immediately beneath the magazine, so that unless they are in their open position, nuts can not pass out of the lower end of the magazine, as will be readily understood.

The other ends of the holding levers M M are formed with the jaws $m'$ $m'$, as shown in Figures 2 and 6, which present an opening toward the rear of the machine. Fixedly mounted upon the upper side of the block H′ of the slide H is a wedge N, which is placed so that it will enter the opening formed by the jaws $m'$ near the completion of the return or inoperative reciprocatory stroke of the said slide H, as indicated in Figure 2. The holding jaws $m$ $m$ of the said levers M will therefore be opened at the end of the return and hence beginning of the rearward or operative stroke of slide H, as will also gripping lever J, as previously explained. The recession of the wedge, concomitantly with the rearward stroke of the slide H, will cause the levers M to be disengaged, whereupon the springs $k^2$ will tend to cause the gripping jaws $m$ $m$ to assume their closed position.

Removably fixed to the frame of the machine, and projecting beneath the magazine and adjustable vertically by means of a set-screw $o$, is a rest O upon which the lowermost nut in the magazine will drop and rest, when both the jaws of levers J and M are in their open positions, which, as was before explained, is at the end of the return stroke of the slide H, in which the latter occupies its position nearest the front of the machine.

Projecting horizontally forward and immediately above the saw, removably secured to the frame of the machine, and terminating back of the magazine L, is a horizontal abutment plate P, adjustable vertically by means of a set-screw $p'$. This plate is located so that the upper surface of a nut while being held by lever J and operated upon may engage the lower surface of the plate during the operative stroke of the slide H, and hence during the sawing operation, the nut, therefore, during such operation being held securely downwardly against the saw. The forward end of this plate is slightly beveled as at $p$, shown in Figure 7, so that the nut may readily pass from beneath the magazine under such plate. The latter is, of course, first adjusted so that the nut will immediately engage the under surface thereof, as soon as such nut comes vertically beneath it.

Before the machine is put in operation, the nuts are placed in a column in the magazine with the faces to be operated upon, down. Assuming that the slide is in its rearmost position, that is, at the point of inception of its return stroke, with the wedge N hence out of engagement with levers M M, the jaws $m$ $m$ will be in their closed position, as shown in Figure 7, and the column of nuts will therefore rest upon levers M M. The slide is now moved through its return stroke by starting the driving mechanism, and thus reaches the extreme end of such stroke, at which time, as before explained, the jaws $m$ $m$ and $j^2$ $j^3$ will assume their open positions. This will permit the column of nuts to move downwardly so as to cause the lowermost nut to rest upon the plate O and be embraced by jaws $j^2$ and $j^3$, and the next nut above to be embraced by the jaws $m$ $m$ of the levers M M. The machine now continuing its operations so as to cause the slide H to begin its rearward travel, the levers M M and the lever J' are released. This causes the jaws $m$ $m$ to grip the next lowermost nut in the magazine, and hold same in its position therein, as well as the column of nuts above it. The release of the lever J causes same to grip the lowermost nut embraced by jaws $j^2$ and $j^3$, and carry same along toward the saw. The position of the plate O is such that the path of travel of the lower face of the nut held by the gripping lever will properly intersect the path of operation of the saw. The travel rearwardly, then, of the slide H will be accompanied by the slotting of the lower face of such gripped nut.

When the rearmost portion of the stroke of the slide H is reached, the lever J is permitted to move, as before explained, to permit the jaws $j^2$ to open, and thereby release the slotted nut, which is again placed in the magazine by hand for the formation of a second slot, if such be desired.

This first slotting operation will, in addition to forming the slot, form a small burr $q$, as shown in Figure $2^d$, which will project from that lateral face of the nut intersected by the slot.

As shown in Figure $2^a$, two pairs of opposite sides of the bore of the magazine are provided with vertical grooves $l'$ $l'$, each of which occupies a central position with reference to its respective side of the bore, as shown. The cross-sectional area of the said bore is made such that the nut with the burr $q$ formed thereon cannot be inserted therein unless said burr is placed in one of the vertical slots $l'$. The magazine is, and hence these slots are, so placed that when such burr is caused to engage one of same, the nut will be caused to assume a position in the magazine in which the slot just formed extends transversely with respect to the plane of the saw, at an angle of sixty degrees thereto. It will, therefore, be seen that when the nut again passes over the saw for the formation of a second slot, the latter will be formed at an angle of sixty degrees with reference to the first slot formed. When this second slot is completed, a second burr $q'$ is formed, as shown in Figure $2^c$. This nut cannot, therefore, be placed in the magazine and travel therethrough without causing both these burrs $q$ and $q'$ to engage two of the slots $l'$. These slots being located as shown, this nut will therefore occupy a position in the magazine in which both of the slots formed therein lie at opposite angles of sixty degrees with reference to the saw plane. The extra slot formed therefore will lie at an angle of sixty degrees with reference to the slots previously formed, and the completion of three diametrical slots intersecting each other, and each being at right angles to the sides of the nut respectively, will be effected.

The extension for carrying the magazine, and all the gripping parts carried by the extension and the slide H, together with the rest O and abutment plate P, are duplicated on the opposite side of the median plane previously referred to, that is, upon the left hand side of the machine, so that a duplicate machine is provided in which the mechanism for driving the slide and connected parts is common.

A second belt (not shown) is provided for driving the pulley C on the left hand side of the machine, this latter pulley, however, effecting merely the operation of the saw D on this side of the machine, and not, as in the case of the pulley on the right hand side of the machine, effecting the double function of driving the saw and also the reciprocating slide through the pulleys C' and E', belt F, shaft E, and connected parts.

What I claim is:

1. In a machine for making castle nuts, the combination of groove-forming means; means movable relative to the latter for alternately gripping and releasing the blank; mechanism for imparting such relative motion; said groove-forming means intersecting the path of relative movement of the blank while held by such gripping means; means for automatically feeding blanks to said gripping means; means for effecting the co-ordination of such blank-feeding means, gripping means, and mechanism for imparting such afore-mentioned relative motion; and a member arranged to act as an abutment for the blank, and adapted to engage same during the groove-forming operation.

2. In a machine for making castle nuts, the combination of groove-forming means; means movable relatively to the latter for alternately gripping and releasing a blank; mechanism for imparting such relative motion; said groove-forming means intersecting the path of relative movment of the blank while held by such gripping means; means for automatically feeding blanks to said gripping means; means for effecting the co-ordination of said blank-feeding means, gripping means, and mechanism for imparting such afore-mentioned relative motion; and a member movable with relation to the blank-gripping means, and arranged to act as an abutment of the latter during the groove-forming operation.

3. In a machine for making castle nuts, the combination of groove-forming means; means movable relatively to the latter for gripping a blank, the direction of movement being transverse with respect to the axis of the blank when held by said gripping means; means for imparting such relative movement; said groove-forming means intersecting the path of the blank while held in such gripping means and being subjected to such relative motion; and a stationary member opposite said groove-forming means and upon the opposite side of said gripping means, adapted to act as an abutment for the blank during the groove-forming operation.

4. In a machine for making castle nuts, the combination of a suitable frame; a rotary saw mounted upon the latter; a reciprocating member mounted upon said frame; a magazine for holding blanks; means for holding said blanks in said magazine; a blank-gripping device mounted upon said reciprocating member; means mounted upon said reciprocating member for actuating said holding means to release the blanks in the magazine; and means for actuating said gripping device subsequently to the actuation of said holding means; said saw being located in the path of movement of a blank while being held by said gripping device.

5. In a machine for making castle nuts, the combination of a suitable frame; a rotary saw mounted upon said frame; a reciprocating slide mounted upon the latter; a magazine for holding blanks; a rest below said magazine for supporting the blanks therein; a holding device for holding said blanks above said support; means on said slide for actuating said holding means to release said blanks and permit same to fall upon said support; a blank-gripping device carried by said reciprocating slide, and provided with gripping jaws arranged to travel to a point adjacent to the discharging end or mouth of the magazine; a member carried by said slide for actuating said gripping means to open, said member and the means for actuating said holding means being arranged to operate when the gripping jaws of the gripping device are beneath said magazine; means adapted to normally hold said gripping device in a closing position; and means for normally maintaining the holding means in a closing position.

6. In a machine for making castle nuts, the combination of a rotary saw suitably mounted, and means for rotating same; a reciprocating slide having a path of movement transverse with relation to the axis of said saw; a blank-holder consisting of a pair of jaws and springs tending to hold same in a closing position, said jaws having an axis of oscillation stationary with relation to the axis of the saw; a blank-gripping device mounted upon said slide, and embodying a jaw and a spring for normally holding same in an open position, the path of movement of said gripping device being such as to cause same to pass beneath said holding jaws; a secondary slide mounted upon said first-named slide, and provided with a member adapted to engage said gripping jaw and actuate same to open against the action of its closing spring; a member mounted upon said slide adapted to engage and open said holding jaws, near the end of the reciprocatory stroke of said slide; an oscillatory lever mounted upon said slide; and a cam fixed with relation to the saw axis engaging one arm of said lever, and adapted to oscillate the latter to engage and actuate said gripping member, said cam being arranged to effect such oscillation at the end of such reciprocating stroke and subsequently to the actuation of the holding jaws.

7. In a machine for making castle nuts, the combination of a tubular magazine for feeding polygonal nut-blanks, having an interior bore corresponding in cross-section with the cross-section of such blanks, and provided with a longitudinal groove in one of its interior faces; means for automatically removing such blanks from the bottom of the magazine; and means for forming a transverse slot upon one face thereof, such slot-forming means being adapted to form a burr at the end of such slot.

Signed by me this 12th day of November, 1919.

JOHN J. GRANT.